May 26, 1925.
H. H. OWENS
AUTO DIRECTION SIGNAL
Filed Dec. 7, 1923
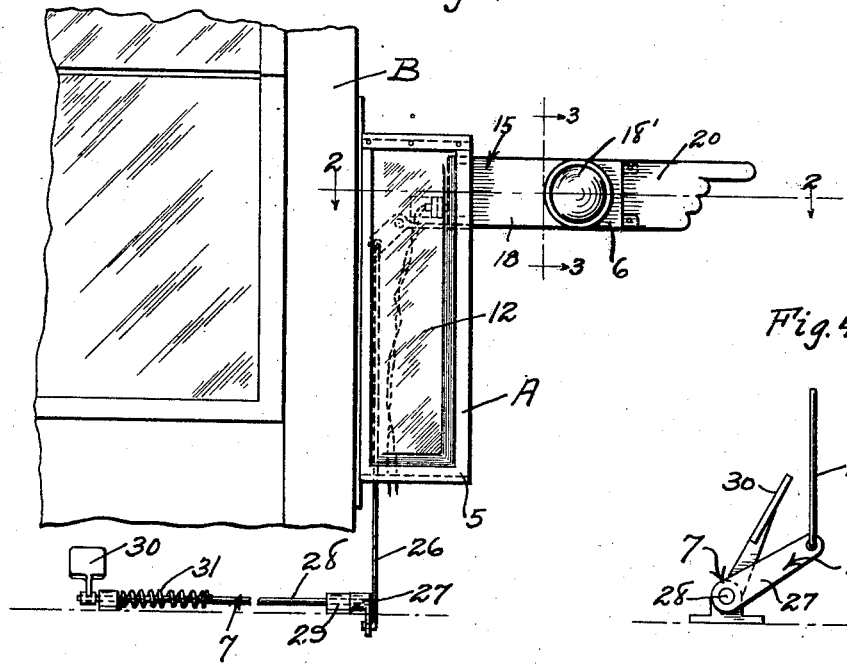
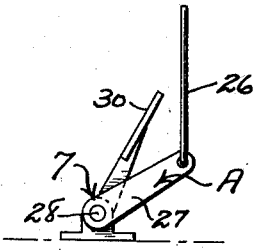
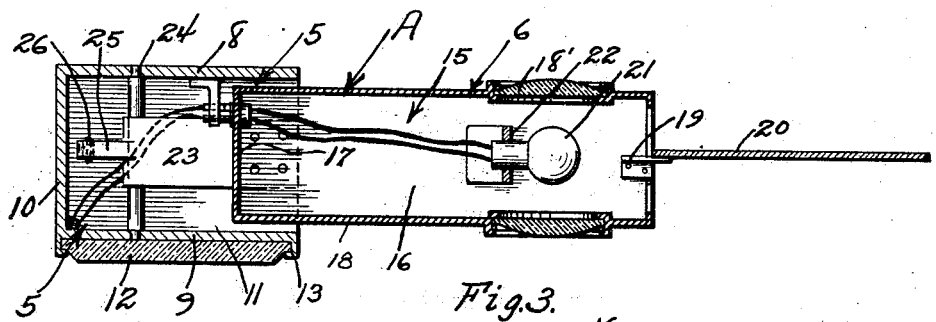
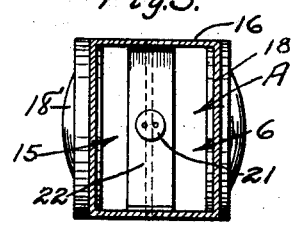
Inventor
Henry H. Owens Patented May 26, 1925.

1,539,367

UNITED STATES PATENT OFFICE.

HENRY H. OWENS, OF MADISON, INDIANA.

AUTO DIRECTION SIGNAL.

Application filed December 7, 1923. Serial No. 679,181.

*To all whom it may concern:*

Be it known that I, HENRY H. OWENS, a citizen of the United States, residing at Madison, in the county of Jefferson and State of Indiana, have invented certain new and useful Improvements in an Auto Direction Signal; of which the following is a specification.

This invention relates to signals for automobiles and the like and the primary object of the invention is to provide an improved direction indicator for automobiles for effectively indicating to traffic the intended course of the vehicle equipped with the indicator, without necessitating the removing of the hands of the driver of the vehicle from the steering wheel.

Another prime object of the present invention is the provision of a direction indicator for motor vehicles embodying a casing secured to each side of the vehicle and a pivoted signalling arm for each casing, the signalling arms having novel means for permitting the extending thereof to an operative indicating position from the interior of the vehicle.

A further object of the invention is the provision of novel means for forming the signalling arm, whereby the same can be readily seen from the front and rear of the vehicle.

A still further object of the invention is to provide an improved direction indicator for motor vehicles which will be durable and efficient in use, one that will be simple and easy to manufacture and one which can be placed upon the market and incorporated with an automobile at a small cost.

With these and other objects in view, the invention consists in the novel construction, arrangement and formation of parts, as will be hereinafter more specifically described, claimed and illustrated in the accompanying drawings, in which drawings:

Figure 1 is an elevation of the improved indicator showing the same attached to a motor vehicle.

Figure 2 is a longitudinal section through a portion of the indicator taken on the line 2—2 of Figure 1.

Figure 3 is a detail transverse section through the indicating arm taken on the line 3—3 of Figure 1, and Figure 4 is a fragmentary side elevation of the means for permitting the operation of the signalling arm from the interior of the vehicle by the foot of the operator of the machine.

Referring to the drawings in detail, wherein similar reference characters designate corresponding parts throughout the several views, the letter A generally indicates the improved direction signal, and B a portion of the motor vehicle with which the same can be associated.

The improved direction signal A comprises a casing 5, a signalling arm 6, and means 7 for operating the indicating arm. While in the drawings I have illustrated one casing and one indicating arm and shown the same disposed at one side of the motor vehicle, it is to be understood, that I provide another casing, indicating arm and operating means therefor arranged on the opposite side of the motor vehicle and that when the arms are extended on one side of the vehicle, it indicates that the vehicle is going to turn in that direction, and when the other arm on the other side of the vehicle is extended, the same indicates that the vehicle is going to turn in that direction.

As shown the casing 5 is secured to the lower portion of the windshield of the motor vehicle, but it is to be understood that the same can be connected to any other preferred part of the vehicle.

The casing 5 includes front and rear walls 8 and 9, and an inner wall 10 which can carry suitable brackets or the like for permitting the attaching of the casing in place. The casing is also preferably provided with top and bottom walls 11.

A mirror 12 can also be attached to the rear wall 9, so that the driver of the vehicle can readily see traffic in rear of his vehicle and the wall 9 carries suitable flanges 13 for engaging the marginal edges of the mirror.

The signalling arm 6 includes a body 15 having parallel longitudinally extending walls 16 and an inner wall 17. These walls 16 and 17 are adapted to support front and rear plates 15 which can have suitable direction indicia painted or otherwise affixed thereon, such as the word "Turn" if so desired. The plates 18 carry transparent bull's eyes 18′ through which the rays of light from the lamp hereinafter described shine. The bull's eyes 18′ on the signal on the left-hand side of the automobile are colored red, while the bull's eyes 18' on the right-hand side of the vehicle are colored green. The outer end of the body portion 15 is left open, as can be clearly seen by referring to Figure 2 of the drawings and a suitable bracket 19 is secured to the wall 16 and this bracket has attached thereto an indicating hand 20, with the index finger thereon extended. This hand 20 is adapted to be painted white and the rays of light emanating from the lamp 21 are adapted to shine thereon to illuminate the same. The lamp 21 is of the incandescent type and is supported by a suitable bracket 22. The current from the lamp 21 can be derived from any suitable source of electrical energy such as a storage battery or the like and any preferred type of switch can be employed for controlling the flow of current thereto. The inner or lower wall 16 has secured thereto an inwardly extending supporting plate 23 which is rockably mounted upon a transversely extending supporting shaft 24. This shaft 24 is carried by the walls 8 and 9 of the casing 5. The plate 23 has formed thereon beyond the shaft 24 an angularly extending operating lug 25 to which is pivotally connected the operating link 26. This operating link 26 extends down toward the floor of the motor vehicle, with which the signal is incorporated and the lower end of the rod 26 is connected to a crank arm 27 keyed or otherwise secured to a rock shaft 28. This rock shaft 28 is carried by suitable bearings 29, which can be bolted or otherwise secured to the floor of the car. The rock shaft 28 which forms a part of the operating mechanism 7 extends inwardly toward the central portion of the automobile and has secured to its inner terminal the operating foot pedal 30. An expansion spring 31 is coiled about the rock shaft 28 and has one terminal secured to the rock shaft and the other terminal to one bearing 29 and the tension of this spring normally holds the pedal 30 in a raised position and the indicating arm 6 in a lowered position in the casing 5.

Now in operation of the improved signal, when the driver of the vehicle is going to change the course thereof, the foot pedal 30 is depressed against the tension of the spring 31, which will push down on the rod 26 and thus raise the indicating arm 6 from out of the casing 5.

The swinging of the arm 6 into its operative position, will indicate to traffic, the direction in which the vehicle is going to turn.

From the foregoing description, it can be seen that I have provided an improved signal for motor vehicles for indicating to traffic the direction in which a vehicle is going to turn, which is of exceptionally simple and durable construction.

Changes in details may be made without departing from the spirit or the scope of this invention.

What I claim as new is:

A direction signal including an upright elongated casing open at its outer side, a vertically swinging signal arm normally disposed within and having a body substantially conforming to said casing, a shaft horizontally arranged in the upper part of the casing and having its ends supported by the front and rear walls of the latter, a plate rigid and co-extensive with the normally inner-wall of the signal arm body and normally projecting upwardly from the normally upper end of the latter, said plate being engaged with said shaft to permit outward and upward swinging of the signal arm to an exposed horizontal position, and an operation lug rigid with and normally projecting inwardly and upwardly from said plate and the shaft, whereby a downward pull on said lug will affect the outward and upward swinging of said signal arm, said signal arm embodying a pointer member rigid with and normally projecting downwardly from the normally lower end of the signal arm body.

In testimony whereof I affix my signature in presence of two witnesses.

HENRY H. OWENS.

Witnesses:
HARRY R. McCoy,
TONY G. SCHLICK.